(12) United States Patent
Traynor et al.

(10) Patent No.: US 8,107,400 B2
(45) Date of Patent: Jan. 31, 2012

(54) SECURE LOCALIZATION FOR 802.11 NETWORKS WITH FINE GRANULARITY

(75) Inventors: Patrick Traynor, Atlanta, GA (US);
Byungsuk Kim, Eulwang-si (KR);
Farooq Anjum, San Diego, CA (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 763 days.

(21) Appl. No.: 12/172,388

(22) Filed: Jul. 14, 2008

(65) Prior Publication Data
US 2009/0022127 A1   Jan. 22, 2009

Related U.S. Application Data

(60) Provisional application No. 60/949,755, filed on Jul. 13, 2007.

(51) Int. Cl.
*H04W 4/00* (2009.01)
(52) U.S. Cl. ......................................... 370/255; 370/338

(58) Field of Classification Search .................. 370/254, 370/255, 338
See application file for complete search history.

(56) References Cited

U.S. PATENT DOCUMENTS

| | | | |
|---|---|---|---|
| 7,242,950 B2 * | 7/2007 | Suryanarayana et al. | 455/456.5 |
| 7,406,320 B1 * | 7/2008 | Kumar et al. | 455/456.1 |
| 7,576,694 B2 * | 8/2009 | Anjum et al. | 342/464 |
| 2004/0028017 A1 | 2/2004 | Whitehill et al. | |
| 2004/0054774 A1 | 3/2004 | Barber et al. | |
| 2007/0124478 A1 | 5/2007 | Abdelhamid et al. | |

OTHER PUBLICATIONS

International Search Report, Jun. 18, 2009, p. 1-9.

* cited by examiner

*Primary Examiner* — Melvin Marcelo
(74) *Attorney, Agent, or Firm* — Westerman, Hattori, Daniels & Adrian, LLP (57) ABSTRACT

A system and method that uses wireless-capable desktop computers in a vicinity such as to enable one to securely determine the location of an untrusted user with office level granularity.

16 Claims, 7 Drawing Sheets

SECURE LOCALIZATION FOR 802.11 NETWORKS WITH FINE GRANULARITY

The present application claims priority under 35 U.S.C. 119 to U.S. Provisional Application Ser. No. 60/949,755, filed Jul. 13, 2007, entitled Secure Localization For 802.11 Networks with Fine Granularity, to P. Traynor, et al., the entire disclosure of which is incorporated herein by reference as though recited herein in full.

BACKGROUND

1. Field

The preferred embodiments of the present invention relate to wireless networks, and to security and to access control within networks.

2. Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An I.E.E.E. standard, I.E.E.E. 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (I.E.E.E. 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an I.E.E.E. MAC address. Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (I.E.T.F.). With Mobile IP, mobile device users can move across networks while maintaining their IP Address assigned once. See Request for Comments (RFC) 3344. NB: RFCs are formal documents of the Internet Engineering Task Force (IETF).

Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Localization:

A problem related to background technologies involves the inability to be able to determine the location of an untrusted user in a wireless network with a high degree of accuracy. The present invention overcomes problems in the background art, and provides a mechanism that can, e.g., prevent spoofing and make collusion as difficult as possible.

The present assignees filed other patent application(s) related to secure localization that did not have all of the benefits of the present invention. See, e.g., Location Dependent Key Management in Sensor Networks Without Using Deployment Knowledge set forth in U.S. application Ser. No. 11/683,312, filed on Mar. 7, 2007, the entire disclosure of which is incorporated herein by reference; and Secure Wireless User Localization Scheme Using Transmission Range Variation as set forth in U.S. application Ser. No. 11/379,566, filed on Apr. 20, 2006, the entire disclosure of which is incorporated herein by reference.

Figure 1:
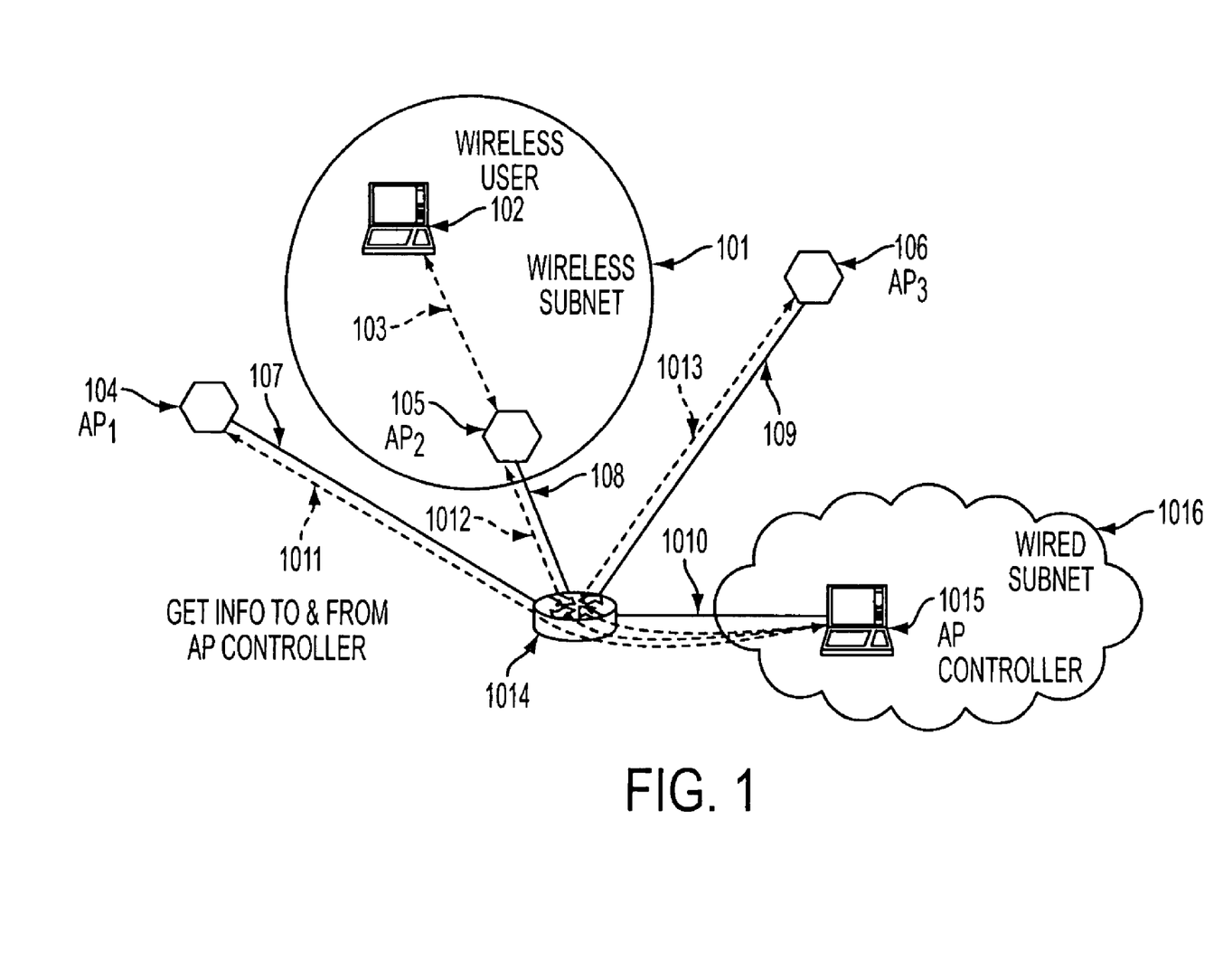
FIG. 1 is a architectural diagram showing a background system.

For reference, FIG. 1 depicts a scheme as described in the above-referenced Ser. No. 11/379,566. With reference to FIG. 1, generally the deployment of a wireless network involves at least one wireless subnet such as wireless subnet 101, in which wireless user devices such as wireless communication device 102 are connected to at least one wired subnet 101b over a radio communication channel 103 to one or more Access Points, such as Access Point (AP) 105, and at least one router, such as router 1014. As shown, the wireless user device 102 is associated with $AP_2$ 105, and can communicate with $AP_2$ 105 via the wireless communication link 103. This background embodiment of the '566 patent application is based on the location estimation being carried out by the network using at least three APs: 104; 105; 106. In accordance with the concepts therein, the property of a current AP that enables it to transmit at different power levels is exploited. Use of a different power level will result in a different transmission range for the AP. The embodiment assumes that each location in the network system under consideration is within the maximum transmission range of multiple APs. Each AP in the system at a given time associates a "nonce," or random number, with each power level and securely transmits each nonce at that power level to the user whose location is to be determined. As a result, every location will have a unique set of nonces from multiple APs associated with it at any given point in time. This set depends on the power levels that each AP has to use to reach the location of interest, which in turn depends on the distance from the location to the various APs. Wireless user device 102 will be able to "hear" a particular set of nonces depending on its location with respect to the APs. The user device 102 is expected to securely transmit back the nonces received. The location of the user device 102 then can be determined based on the set of nonces transmitted back. The presence of multiple (e.g., at least three) APs makes it possible to securely determine the location of a wireless user device in the wireless network. An AP Controller (APC) 1015 is a central entity that manages all of the APs and user devices of the network.

The APC 1015 has detailed information about the user devices and APs, which may be obtained via repeated SNMP (Simple Network Management Protocol) queries. The APC 1015 either acts as a gateway router or controls a gateway router in order to set up an access control list for Intranet or Internet access. APC 1015 controls the localization process and is assumed to have the nonce set corresponding to each location within the deployment site. This may be obtained during a pre-deployment phase and may be maintained in a database (e.g., location table). The APC 1015 is connected to the various APs (104, 105, 106) in the network via the backbone wired network (1010, 1011, 1012, 1013, 1014). FIG. 1 also illustrates wired communication links 107, 108, and 109. The APs (104, 105, 106) act as a bridge between the internal wired and wireless subnet domains 1016 and 101. The APs (104, 105, 106) can be any commercially available access point with the ability to transmit at various power levels. Such multiple power level transmission capability is currently a feature built into various commercially available APs such as Cisco AP1100, D-Link DWL-2100AP, and others. A secure localization method according to one embodiment of the '566 application is based on transmission of nonces (random numbers) at different power levels from various APs. The location of a wireless user can be estimated depending on the set of nonces received by the user device and transmitted back to the APC via the APs.

Figure 6:
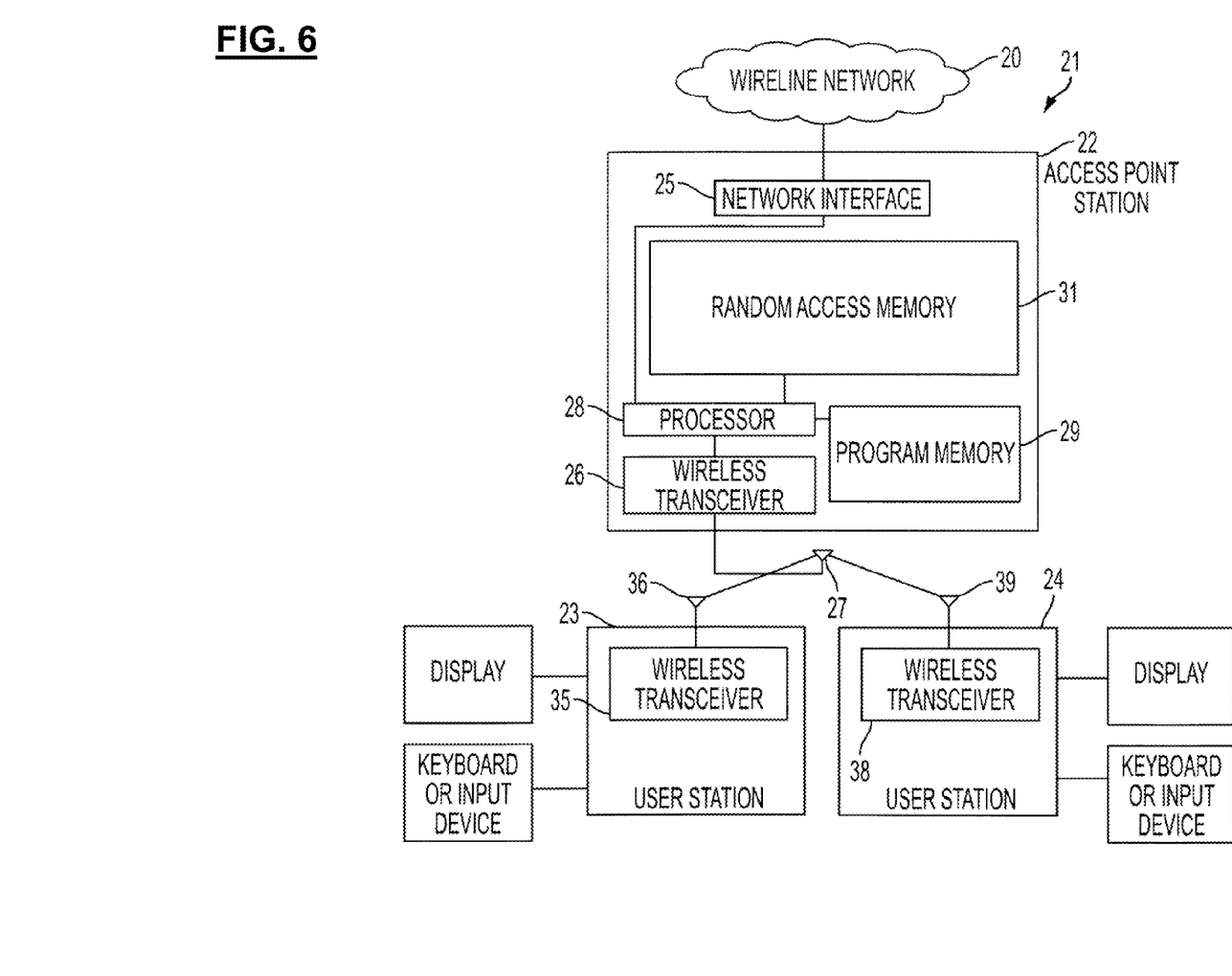
FIG. 6 is an architectural diagram showing components of illustrative access points and client devices in some illustrative environments within which embodiments of the present invention could be employed.

Illustrative Architecture:

FIG. 6 depicts some illustrative architectural components that can be employed in some illustrative and non-limiting implementations including wireless access points to which client devices communicate. In this regard, FIG. 6 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

Figure 7:
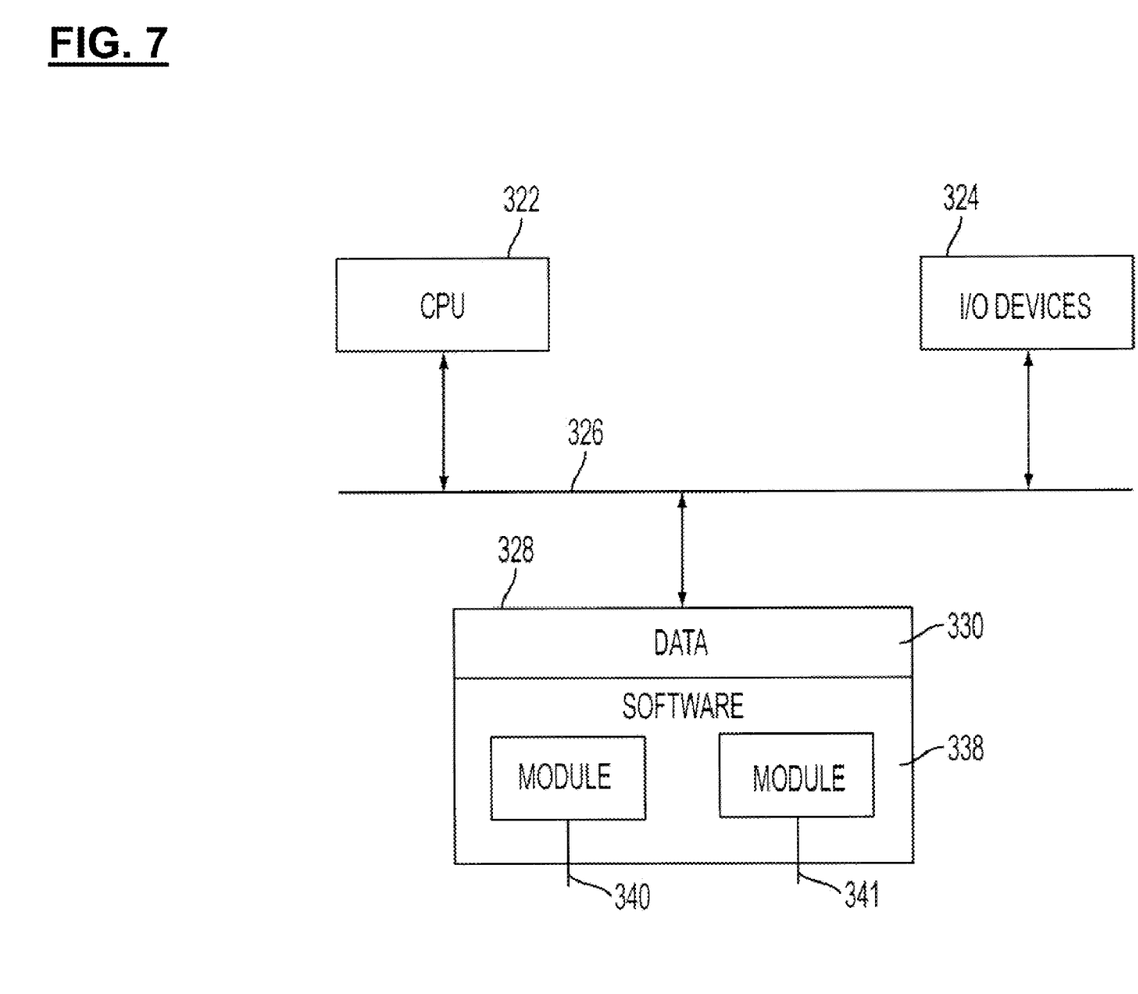
FIG. 7 is a schematic diagram showing an illustrative computer or control unit that can be used to implement computerized process steps, to be carried out by devices, such as, e.g., an access point, a client device, a computer, etc.

FIG. 7 shows an illustrative computer or control unit that can be used to implement computerized process steps, to be carried out by devices, such as, e.g., an access point, a client device, a computer, a user station, a source node or destination node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

SUMMARY

The preferred embodiments improve upon existing systems and methods in the background art.

According to the preferred embodiments, through the use of wireless-capable desktop computers in the vicinity, one can securely determine the location of an untrusted user with office level granularity. According to some preferred embodiments, wireless access points (APs) broadcast tokens at different power levels. Because of the limits of wireless communications, each untrusted user in the system will only be able to hear a subset of those tokens. According to the preferred embodiments, the tokens are returned to a controller (e.g., an administrative machine) that compares the tokens received with profiles of different locations. Preferably, when a match is found, the system transitions from "macro" to "pico" modes. In the "pico" mode, the controller preferably uses the general location information learned in the "macro" phase. The controller preferably selects machines within and around the area and generates new tokens for them to broadcast. The client also preferably returns these tokens to the controller, which again compares them against known location profiles. Based on these two steps, the controller determines the location of the client.

According to some embodiments, a method of localizing mobile client devices within a geographical area, comprising: a) having an Access Point Controller generate tokens and provide the tokens to a plurality of Access Points within a geographical area; b) having the Access Points transmit said tokens for receipt by client devices within said geographical area; c) having at least one client device within said geographical area inform the Access Point Controller of the tokens that it receives from the Access Points; and d) having the Access Point Controller determine a Macro-Location of the client device based on the tokens received by the client device; e) having the Access Point Controller generate new tokens for transmission to a plurality of computers distributed at least within the Macro-Location within said geographical area to wirelessly transmit to said client device; f) having the client device inform the Access Point Controller of the new tokens that it receives from the computers distributed within said geographical area; and g) having the Access Point Controller determine a Pico-Location of the client device based on the new tokens received by the client device.

In some examples, wherein said computers include desktop or personal computers configured with an 802.11 wireless interface and adapted to operate as a Pico-AP. In some examples, the method further includes performing access control of said client device based on the Pico-Location of the client device. In some examples, the method further includes performing security functions within said client device based on the Pico-Location of the client device, such as, e.g., including performing or limiting performance of applications or programs on said client device based on the Pico-Location of the client device.

According to some other embodiments, a method of location mapping for localizing mobile client devices within a geographical area is provided that includes: a) having an Access Point Controller generate tokens for a plurality of Access Points to transmit within a geographical area; b) having the Access Points wirelessly transmit the tokens to computers distributed within the geographical area; c) having the computers report to the Access Point Controller regarding the tokens received from the Access Points; d) having the Access Point Controller develop statistical mapping of one or more regions within said geographical area based on comparisons of the tokens it sent out to Access Points to transmit and tokens reported back to the Access Point Controller.

According to some other embodiments, an Access Point Controller for localization of client devices within a geographical region, is provided that includes: a) said controller being configured to generate tokens for transmission to a plurality of Access Points; b) said controller being configured to transmit said tokens to Access Points within a geographical area for subsequent wireless transmission to client devices within the geographical area; c) said controller being configured to receive reports from said client devices within the geographical area as to the tokens received from the Access Points; d) said controller being configured to perform a Macro-Localization of a client device based on the tokens received by the client device; e) said controller being configured to generate new tokens for transmission to a plurality of computers within at least a macro-localized region within said geographical area for subsequent transmission to client devices; f) said controller being configured to receive reports from client devices within the macro-localized region within the geographical area as to the new tokens received from the computers; g) said controller being configured to determine a Pico-Location of the client device based on the new tokens received by the client device.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DESCRIPTION OF THE PREFERRED EMBODIMENTS

While the present invention may be embodied in many different forms, a number of illustrative embodiments are described herein with the understanding that the present disclosure is to be considered as providing examples of the principles of the various inventions described herein and that such examples are not intended to limit the invention to preferred embodiments described herein and/or illustrated herein.

The Preferred Embodiments

Wireless access points (APs) broadcast tokens at different power levels. Because of the limits of wireless communications, each untrusted user in the system will only be able to hear a subset of those tokens. According to the preferred embodiments, the tokens are returned to a controller (e.g., an administrative machine) that compares the tokens received with profiles of different locations. Preferably, when a match is found, the system transitions from "macro" to "pico" modes. In the "pico" mode, the controller preferably uses the general location information learned in the "macro" phase. The controller preferably selects machines within and around the area and generates new tokens for them to broadcast. The client also preferably returns these tokens to the controller, which again compares them against known location profiles. Based on these two steps, the controller determines the location of the client.

To further assist in the process, the system can employ a mapping mode, which creates the aforementioned profile information. In some examples, this mapping can be launched in an on-demand fashion to dynamically build policy maps of any location.

Among other things, the preferred embodiments have substantial advantages over prior systems and/or methods. Among other things, the present solution can be multi-modal and can provide enhanced accuracy through the use of two levels of localization. The present solution can replace the means by which the tokens are generated over the background technologies; and, the present solution can advantageously use the result of cryptographically secure hash function to prevent a user from determining the context of the token itself.

The idea of using, e.g., 802.11 complaint radios (which can be, e.g., relatively inexpensive) attached to all or many desktop computers or the like in an office setting has only recently been suggested. Substantially the only technique to use this new architecture for security purposes relies upon the measurement of the strength of signal received from the untrusted client. In that regard, signal strength measurement is the state of the art in this field. However, such can be an insecure practice. In the preferred embodiments herein, a system incorporates this new capability into a larger system, which uses, e.g., all or many wireless devices and the generation of random tokens to assist in the process of localization.

The present inventors have designed and implemented a preliminary version of this architecture. Preliminary micro-benchmarking and system characterization have yielded promising results. For example, the overhead of this process has been kept very low in terms of both requisite bandwidth (e.g., 33 bytes per token) and processing overhead (e.g., sub 1 millisecond to generate 30 tokens).

The present invention has substantial advantages over existing technologies. For example, a notable advantage of the present scheme is not only that it provides unforgeable proof of the location of an untrusted user, but it also does so with a high level of granularity. All work done outside of the present assignee(s) to this point relies upon measuring signal strength, which can easily be forged by an adversary. In using multiple power levels and then performing our broadcasts in multiple modes, we can be sure that the location can be accurately decided upon.

In some illustrative applications of the present invention, given the level of granularity offered by this invention, a company could, e.g., begin to offer location-based services within their enterprise. For example, selecting a printer could be as easy as pressing "print" and having the network determine the closest printer to which the client can be granted access. The invention can also be used to automatically encrypt sensitive data/files when a client leaves "safe" areas. As some examples, companies working with credit card or social security numbers would benefit from such a practice.

Figure 2:
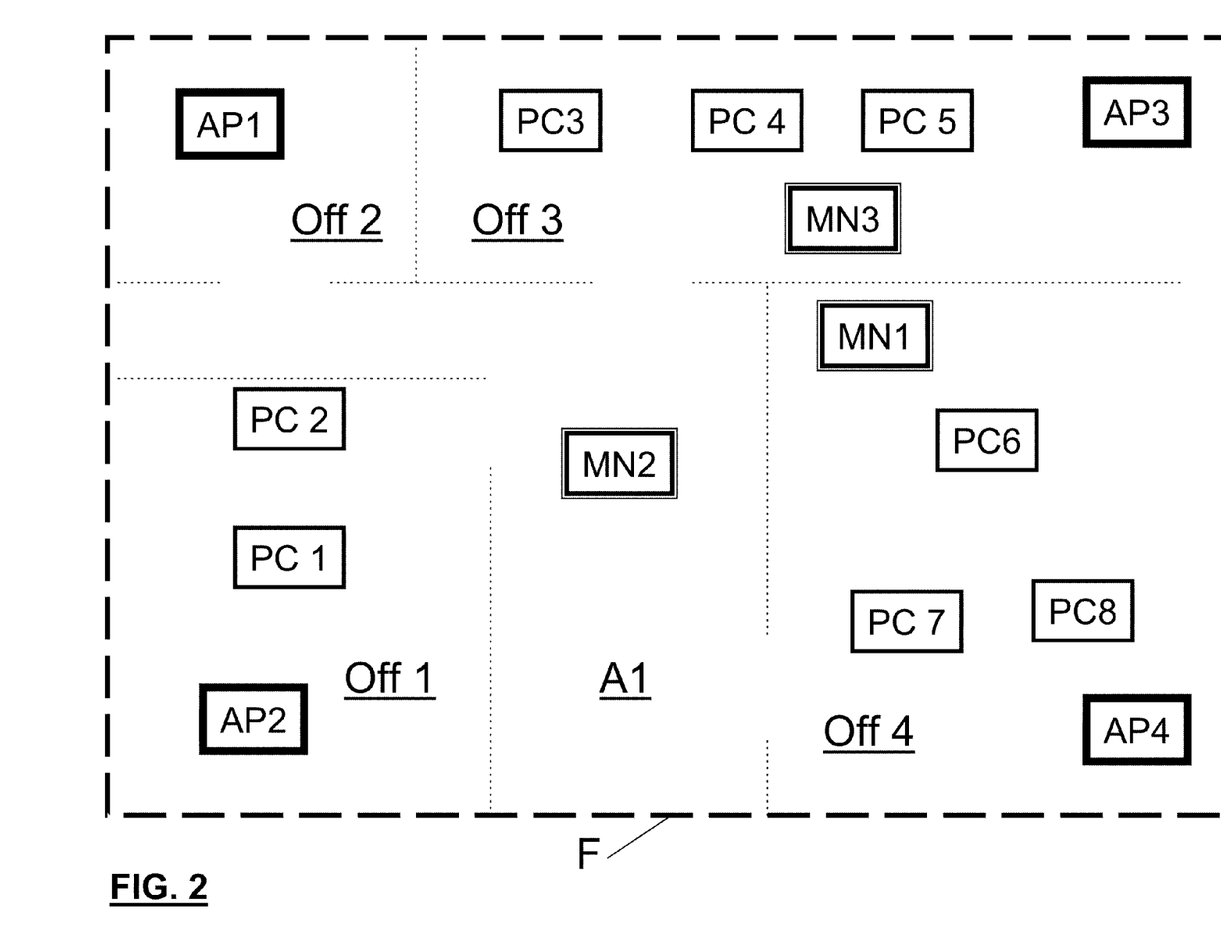
FIG. 2 is a schematic diagram depicting an illustrative environment within which some embodiments of the present invention can be implemented.

For illustrative purposes, FIG. 2 shows an illustrative facility F (such as, e.g., an office building or the like). It should be appreciated that an illustrative facility can involve any type or number of facilities, including one or more buildings or structures, a campus, etc. In the illustrative example, the facility F includes a plurality of office rooms Off 1, Off 2, Off 3, and Off 4, and a central area A1. In the illustrative example, four Access Points AP1, AP2, AP3, AP4 are located in the facility F, and a plurality of desk top computers PC 1 to PC 8 are distributed around the facility F. In addition, the illustrative example also shows a plurality of client devices MN1, MN2 and MN3 in different locations (e.g., different rooms or offices) within the facility. As should be appreciated based on the present disclosure, embodiments of the present invention could be employed in the context of, e.g., the environment shown in FIG. 2 as one example. In that regard, e.g., the locations of the client devices MN1-MN3 can be ascertained with fine granularity by employing aspects of the present invention, such as, e.g., in which some or all of the desk top computers PC1 to PC8 include 802.11 radio capabilities as described above, and that the locations of these client devices can be dynamically maintained over time (such as, e.g., to keep track of locations of the client devices, especially when the client devices are mobile nodes that can be quickly and frequently moved throughout the facility F, and even from the facility.

Figure 3:
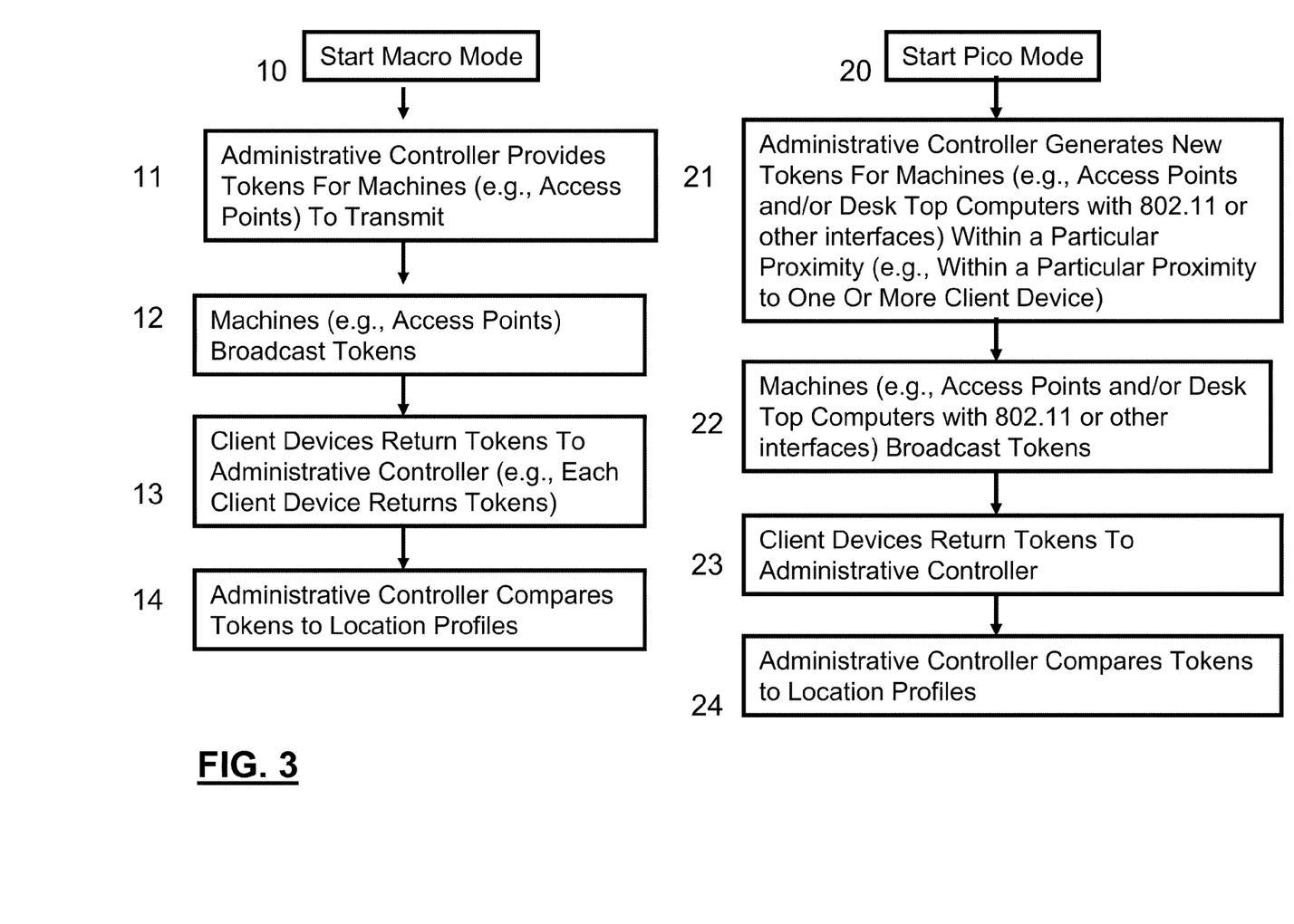
FIG. 3 is an illustrative flow diagram depicting process steps to be carried out in some illustrative embodiments of the invention.

For illustrative purposes, FIG. 3 depicts some of the process steps to be carried out in some embodiments of the invention as described above.

For reference, in FIG. 3, step 10 depicts the start of the macro mode in some embodiments. At step 11, an Administrative Controller provides tokens for machines (such as, e.g., Access Points), for the Access Points to transmit. By way of example, in FIG. 2, the Access Points could include AP1 to AP4 as shown. As shown, at step 12, the machines (e.g., Access Points) can broadcast or transmit their respective tokens provided by the Administrative Controller for receipt by client devices. By way of example, the mobile nodes MN1 to MN3 in FIG. 2 show some illustrative client devices according to some examples. As shown, at step 13, the client devices will return the tokens to the administrative controller. By way of example, and not limitation, in some embodiments the client devices can send wireless transmissions that will be received via one of the Access Points and transmitted to the Administrative Controller. Then, at step 24, the Administrative Controller preferably compares tokens to location profiles.

Similarly, for reference, in FIG. 2, step 20 depicts the start of the pico mode in some embodiments. At step 21, an Administrative Controller generates new tokens for machines (such as, e.g., Access Points and/or Desk Top Computers with 802.11 or the like interfaces). In some preferred embodiments, as shown, the new tokens are generated for machines within a particular proximity of the client devices detected. By way of example, in FIG. 2, the Access Points could include AP1 to AP4 as shown and the Desk Top Computers can include some or all of PC1 to PC 8 in the illustrative example. As shown, at step 22, the machines can broadcast or transmit their respective new tokens provided by the Administrative Controller for receipt by client devices. As shown, at step 23, the client devices will return the tokens to the administrative controller. By way of example, and not limitation, in some embodiments the client devices can send wireless transmissions that will be received via one of the Access Points and transmitted to the Administrative Controller. Then, at step 24, the Administrative Controller preferably compares tokens to location profiles.

Further Discussion of Exemplary Embodiments

Location-Based Access Control

The combination of inexpensive hardware and wireless networking has helped to erode traditional network perimeters. Whereas it was once reasonable to assume that a user would always log in from the same physical point, that assumption is no longer valid. Accordingly, it may no longer be sufficient for a user to simply identify himself—e.g., the user may also need to identify their location.

Current methods, which are dependent upon signal strength measurements, are subject to location spoofing. In the preferred embodiments, the present scheme is based on a client reporting a series of received tokens. These tokens appear semantically meaningless, but help the network to determine the location of the client. To ensure that we find location with a high degree of accuracy, in the preferred embodiments, localization is performed at multiple scales.

Macro-Localization

Figure 4:
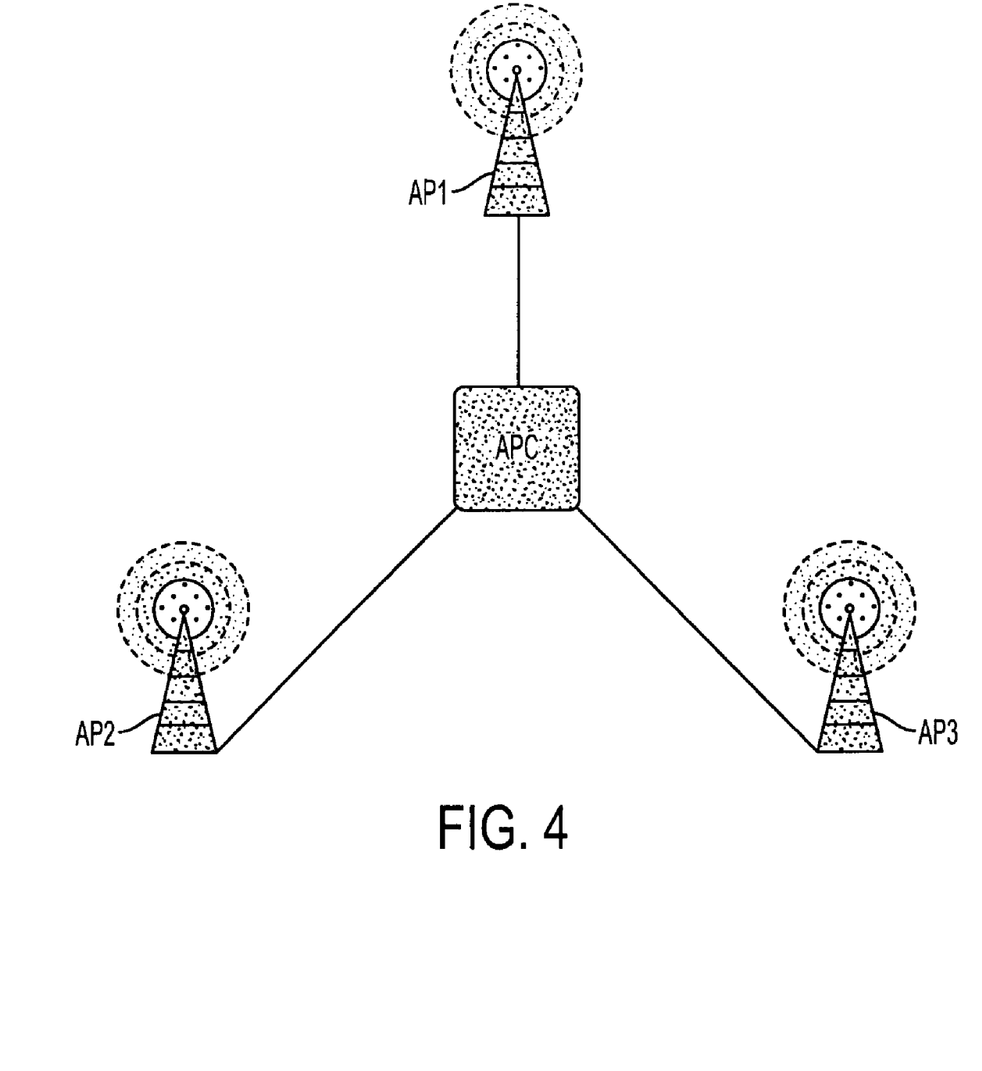
FIG. 4 is a diagram showing illustrative architectural components in some illustrative embodiments of the invention.
Figure 5:
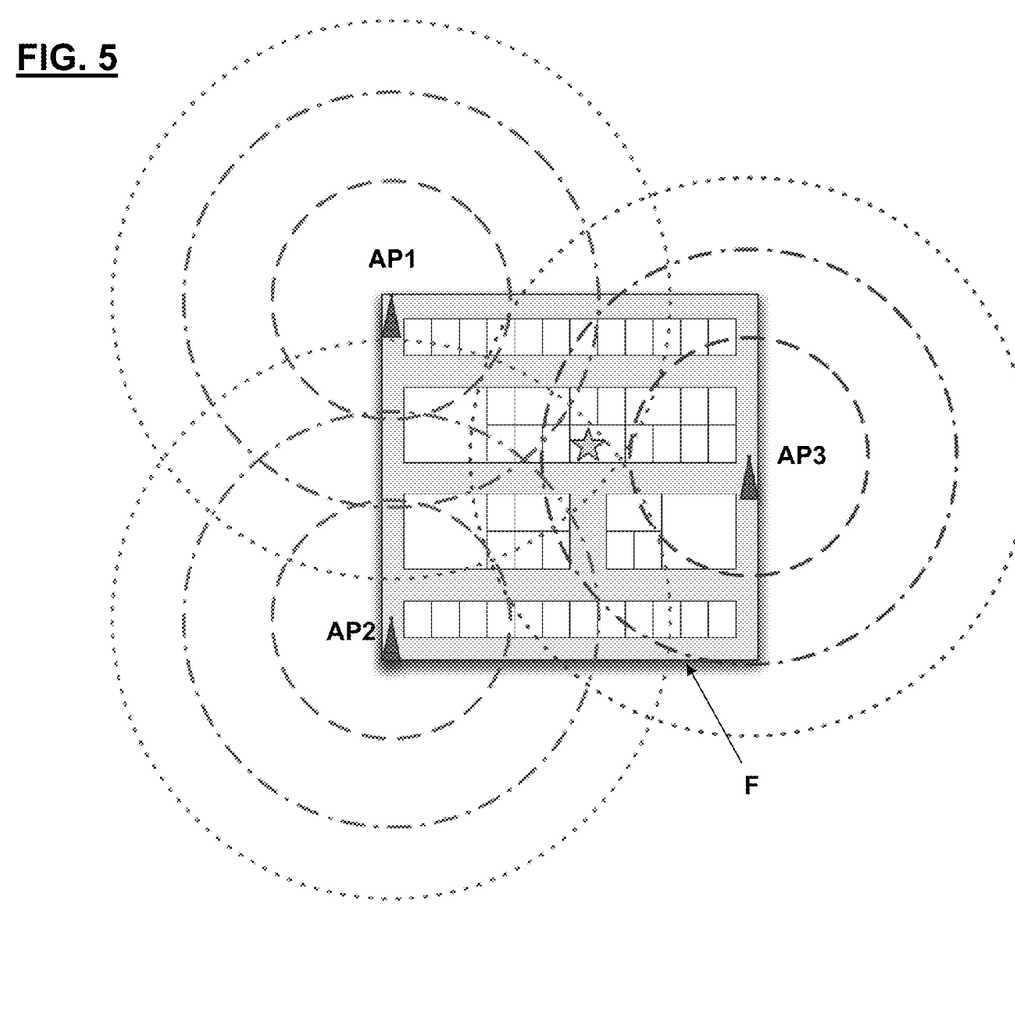
FIG. 5 is a schematic diagram depicting another illustrative environment within which some embodiments of the present invention can be implemented.

In some embodiments, with reference to FIGS. 4 and 5, an Access Point Controller (APC) generates a series of tokens (e.g., random or pseudo-random) and transmits them to a plurality of Access Points (AP) (which can be wireless or wireline connected to the APC). In FIGS. 4 and 5, three illustrative APs are shown, AP1, AP2 and AP3. In some embodiments, each connected Access Point (AP) receives a token and a set of parameters indicating the power with which each token should be transmitted. A client device, signified in FIG. 5 by a star shown in a particular office within the facility F, records the tokens it hears (e.g., which can be from a plurality of Access Points). Note: in some embodiments, each single AP can be made to transmit a plurality of tokens, with each of the plurality of tokens being transmitted at different power levels so as to further assist in localization based on tokens received being representative of distance from a particular AP. For example, in some embodiments, as shown in FIG. 5 with varied dashed line circles around the access points, the differing concentric dashed-line circles can represent differing token transmission regions.

At the end of the phase, the client informs the Access Point Controller which tokens it has received. The APC compares these tokens against a list of tokens that should have been received at each location and then determines the corresponding general or macro location.

Pico-Localization

The foregoing Macro-Localization provides a general area for a client's location. In some situations, one may need to know a more specific location (such as, e.g., a specific office or room). According to some embodiments, the APC re-launches the localization phase, but this time the APC receives (e.g., asks for) assistance from certain deployed hardware (such as, e.g., desktop computers), which can be, e.g., distributed throughout the facility F (such as, e.g., within particular offices in the facility).

In this regard, by way of example, desktop computers throughout a particular office and/or throughout a facility, can be equipped with wireless broadcasting capabilities, such as, e.g., U.S.B. 802.11 wireless cards. These can be relatively inexpensive attachments (costing, e.g., less than about $30.00 each) and can allow PCs to act essentially as local Access Points (APs). In some embodiments, at a single low power, each PC (referred to herein as a "Pico-AP") can broadcast a new set of tokens (e.g., pseudo-random tokens) generated by the APC. In return, the client devices can then return the new set of tokens that it receives to the APC. Upon receiving the second token report, the APC can determine a more exact location for each client.

Location Mapping Mode

Developing maps of wireless coverage for an area is time consuming using traditional means. More importantly, wireless coverage is constantly changing, so static representations are not realistic. It is, therefore, important to be able to dynamically generate accurate representations of coverage.

In the preferred embodiments, a mapping mode is provided—e.g., an automatic means of characterizing the coverage of each AP for a given environment.

In some embodiments, the mapping mode is similar to the standard operation of the localization tool. APs broadcast a series of tokens generated by the APC. The Pico-APs then report the tokens they hear back to the APC, which compares these tokens against the ones it sent out. Over time, the APC can develop, e.g., statistical maps of regions, such that it can anticipate with a high probability the tokens a client should hear.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of localizing mobile client devices within a geographical area, comprising:
   a) having an Access Point Controller generate tokens and provide the tokens to a plurality of Access Points within a geographical area;
   b) having the Access Points transmit said tokens for receipt by client devices within said geographical area;
   c) having at least one client device within said geographical area inform the Access Point Controller of the tokens that it receives from the Access Points; and
   d) having the Access Point Controller determine a Macro-Location of the client device based on the tokens received by the client device;
   e) having the Access Point Controller generate new tokens for transmission to a plurality of computers distributed at least within the Macro-Location within said geographical area to wirelessly transmit to said client device;
   f) having the client device inform the Access Point Controller of the new tokens that it receives from the computers distributed within said geographical area; and
   g) having the Access Point Controller determine a Pico-Location of the client device based on the new tokens received by the client device.

2. The method of claim 1, wherein said computers include desk top or personal computers configured with an 802.11 wireless interface and adapted to operate as a Pico-AP.

3. The method of claim 1, further including performing access control of said client device based on the Pico-Location of the client device.

4. The method of claim 1, further including performing security functions within said client device based on the Pico-Location of the client device.

5. The method of claim 4, further including said security functions including performing or limiting performance of applications or programs on said client device based on the Pico-Location of the client device.

6. A method of localizing mobile client devices within a geographical area, comprising:

a) having an Access Point Controller generate tokens for transmission within a geographical area;
b) having computers within the geographical area configured as Pico Access Points transmit said tokens for receipt by client devices within said geographical area;
c) having client devices inform the Access Point Controller of the tokens that it receives from the computers distributed within said geographical area; and
d) having the Access Point Controller determine a Pico-Location of the client device based on the tokens received by the client device from the computers.

7. The method of claim 6, further including:
a) having the Access Point Controller initially generate tokens and provide the tokens to a plurality of Access Points within a geographical area;
b) having the Access Points transmit said tokens for receipt by client devices within said geographical area;
c) having at least one client device within said geographical area inform the Access Point Controller of the tokens that it receives from the Access Points; and
d) having the Access Point Controller determine a Macro-Location of the client device based on the tokens received by the client device.

8. The method of claim 6, further including performing location mapping for localizing mobile client devices within a geographical area which includes:
a) having the Access Point Controller generate tokens for a plurality of Access Points to transmit within a geographical area;
b) having the Access Points wirelessly transmit the tokens to computers distributed within the geographical area;
c) having the computers report to the Access Point Controller regarding the tokens received from the Access Points;
d) having the Access Point Controller develop statistical mapping of one or more regions within said geographical area based on comparisons of the tokens it sent out to Access Points to transmit and tokens reported back to the Access Point Controller.

9. The method of claim 6, further including having said computers include desk top or personal computers configured with an 802.11 wireless interface.

10. The method of claim 6, further including performing access control of a client device based on the Pico-Location of the client device by the Access Point Controller taking into account tokens reported by the client device.

11. The method of claim 6, further including performing security functions within said client device based on the Pico-Location of the client device by the Access Point Controller taking into account tokens reported by the client device.

12. A method of location mapping for localizing mobile client devices within a geographical area, comprising:
a) having an Access Point Controller generate tokens for a plurality of Access Points to transmit within a geographical area;
b) having the Access Points wirelessly transmit the tokens to computers distributed within the geographical area;
c) having the computers report to the Access Point Controller regarding the tokens received from the Access Points;
d) having the Access Point Controller develop statistical mapping of one or more regions within said geographical area based on comparisons of the transmitted tokens said Access Point Controller sent out to said Access Points to transmit to said computers and said received tokens reported back by said computers to the Access Point Controller.

13. The method of claim 12, further including having said computers include desk top or personal computers configured with an 802.11 wireless interface.

14. The method of claim 12, further including performing access control of a client device based on the Pico-Location of the client device by the Access Point Controller taking into account tokens reported by the client device and the statistical mapping.

15. The method of claim 12, further including performing security functions within said client device based on the Pico-Location of the client device by the Access Point Controller taking into account tokens reported by the client device and the statistical mapping.

16. An apparatus for localization of client devices within a geographical region, comprising:
an Access Point Controller, wherein:
said controller being configured to generate tokens for transmission to a plurality of Access Points;
said controller being configured to transmit said tokens to Access Points within a geographical area for subsequent wireless transmission to client devices within the geographical area;
said controller being configured to receive reports from said client devices within the geographical area as to the tokens received from the Access Points;
said controller being configured to perform a Macro-Localization of a client device based on the tokens received by the client device;
said controller being configured to generate new tokens for transmission to a plurality of computers within at least a macro-localized region within said geographical area for subsequent transmission to client devices;
said controller being configured to receive reports from client devices within the macro-localized region within the geographical area as to the new tokens received from the computers; and
said controller being configured to determine a Pico-Location of the client device based on the new tokens received by the client device.

\* \* \* \* \*